United States Patent [19]

Borys

[11] Patent Number: 4,698,891

[45] Date of Patent: Oct. 13, 1987

[54] SEPARATOR FOR INSULATED WINDOW GLASS

[76] Inventor: Ryszard Borys, 21990 6th Ave., Lake Villa, Ill. 60046

[21] Appl. No.: 922,817

[22] Filed: Oct. 21, 1986

Related U.S. Application Data

[63] Continuation of Ser. No. 721,796, Apr. 10, 1985, abandoned.

[51] Int. Cl.[4] .......... B23P 17/00

[52] U.S. Cl. .......... 29/417; 29/429; 29/458; 52/172; 52/304; 52/790; 156/93; 156/203; 156/276; 156/308.4; 228/147; 228/176

[58] Field of Search .......... 52/127.1, 172, 302, 52/304, 743, 788–790; 156/93, 203, 217, 276, 308.4; 29/417, 429, 458; 228/147, 148, 151, 176

[56] References Cited

U.S. PATENT DOCUMENTS

| | | | |
|---|---|---|---|
| 3,015,859 | 1/1962 | Bloom | 264/257 |
| 3,100,677 | 8/1963 | Frank et al. | 264/71 |
| 3,280,523 | 10/1966 | Stroud et al. | 52/172 |
| 3,380,145 | 4/1968 | Stroud et al. | 29/411 |
| 3,807,015 | 4/1974 | Steger | 29/157 |
| 3,899,858 | 8/1975 | Zanker | 52/172 |
| 4,074,480 | 2/1978 | Burton | 52/172 |
| 4,109,432 | 8/1978 | Pilz | 52/172 |
| 4,322,926 | 4/1982 | Wölflingseder | 52/172 |
| 4,335,166 | 6/1982 | Lizardo et al. | 428/34 |
| 4,358,497 | 11/1982 | Miska | 428/85 |
| 4,446,181 | 5/1984 | Wood | 428/36 |
| 4,455,796 | 6/1984 | Schoofs | 52/172 |
| 4,551,364 | 11/1985 | Davies | 428/34 |
| 4,576,841 | 3/1986 | Lingemann | 428/34 |
| 4,651,482 | 3/1987 | Borys | 52/172 |

FOREIGN PATENT DOCUMENTS

| | | | |
|---|---|---|---|
| 3203808 | 8/1983 | Fed. Rep. of Germany | 52/172 |
| 2370160 | 6/1978 | France | 52/172 |
| 2518158 | 6/1983 | France | 52/788 |
| 2521630 | 8/1983 | France | 52/788 |

*Primary Examiner*—John E. Murtagh
*Assistant Examiner*—Andrew Joseph Rudy
*Attorney, Agent, or Firm*—Laff, Whitesel, Conte & Saret

[57] ABSTRACT

An elongated spacer is disclosed for use in separating the glass panes in multiple-glazed thermal windows. The spacer has an elongated hollow interior for storing a dessicant material and a plurality of moisture barrier partitions at intervals along the length of the interior. The spacers are originally manufactured in oversized lengths and later cut to fit particular windows. The partitions divide the elongated interior into subcompartments, and when the spacer is cut to length the partitions confine moisture contamination and dessicant loss to the particular subcompartment which is cut.

10 Claims, 4 Drawing Figures

SEPARATOR FOR INSULATED WINDOW GLASS

This is a continuation of U.S. patent application Ser. No. 06/721,796, now abandoned, filed Apr. 10, 1985.

This invention relates to insulated windows comprising two or more panes of glass, and is particularly directed to an improved spacer of the type used for separating adjacent panes and for containing a dessicant material to control humidity in the air space between the panes.

BACKGROUND OF THE INVENTION

Conventional insulated windows employ a plurality of panes of glass which trap air spaces between each pair of adjacent panes to serve a thermal insulation function. Elongated spacers are normally placed at the top, bottom and sides of each such air space to physically separate the adjacent panes.

A common problem with such multi-glazed windows, however, is that they are prone to clouding due to condensation of moisture which is trapped in the air spaces between adjacent panes. It is customary to deal with this difficulty by putting a dessicant material in the air spaces to sequester the moisture and thereby prevent condensation.

The usual practice is to use the spacers as containers for the dessicant material. The most common form of spacer is a piece of elongated sheet metal which has been folded up into a rectangular, hollow channel-shaped cross-section to define an interior compartment within which the dessicant is contained. Each spacer is provided with a row of openings communicating with the interior compartment thereof, and the spacers are installed with these openings facing the air space which is between the glass panes. This permits air exchange to take place between the air space and the interior compartments of the spacers, so that dehumidification of the air space by the dessicant inside the spacers can take place.

Insulated windows of the kind under discussion are often retrofitted to older buildings which were initially constructed with single-glazed windows. Installation of such retrofit windows may be done using spacers which are cut to size and filled with dessicant at the building site, or it may involve prefabrication of dessicant-containing spacers in standard lengths which exceed the dimensions of the windows. Such prefabricated spacers are later cut to the required shorter lengths at the time of installation.

For reasons of cost and convenience, the prefabrication approach is often preferred; but it has certain disadvantages which must be addressed. For one thing, the dessicant material inside the spacers must be protected from contact with ambient air until the time of installation; otherwise it would become saturated with moisture and be rendered nearly useless for the purpose of dehumidification.

For this reason, prefabricated spacers are usually provided with an adhesive tape which covers the air-exchange openings, and which is stripped off only when the spacer is installed. In addition, sealing plugs are provided at each end of the hollow spacer to physically retain the dessicant material inside the compartment and to prevent ambient moisture from entering through those ends.

U.S. Pat. No. 4,074,480 of Burton is an example of a prefabricated, dessicant-containing window spacer of this type, which employs such sealing tape and end plugs to protect and retain the dessicant prior to installation.

Other problems which afflict prefabricated spacers, and which are not recognized by Burton, arise as a result of the fact that at the time of installation the length of each standardsized spacer must be reduced to fit the actual dimensions of the windows on which it is to be installed. When one end of a spacer is cut off for this purpose, the end plug which was located at that end is necessarily removed, and consequently the spacer then is liable to lose significant amounts of its dessicant material if care is not taken to prevent that material from falling out of the cut end.

In addition, once the end is cut off and the end plug thereby removed, all the dessicant material in the remaining portion of the spacer is exposed to ambient moisture entering through the cut end. Even though cutting of the prefabricated spacer to useable length is not done until shortly before installation, there still remains a significant time period after cutting and until all four of the spacers and the newly added glass pane are finally put in place, during which the entire dessicant content of the spacer is exposed to moisture contamination through the cut end.

After the spacers are cut to size, the end plugs are usually replaced with "corner" plugs which serve to join the upper and lower spacers to the side spacers at the corners of the window. But these corner plugs do not make a tight moisture seal against the walls of the dessicant compartment.

Exposure to ambient moisture during the installation procedure is a significant problem, because the useful life of a multi-glazed window (i.e. the number of years which elapse before it begins to exhibit condensation problems) depends strongly upon how much moisture contamination occurs during the period immediately prior to installation. Accordingly, any improvement in the moisture protection of the dessicant during this critical interval will result in a substantial improvement in the longevity of a costly retrofit installation.

U.S. Pat. No. 4,109,432 of Pilz addresses the problem of physical loss of dessicant material, but does not recognize the more critical difficulty of moisture contamination. This patent discloses a plastic molded spacer having a hollow interior space for containing dessicant material. In addition, it suggests that: "The movement of the [dessicant] material . . . in a longitudinal direction within the hollow space . . . can be prevented by suitable longitudinally spaced transverse walls or constrictions . . . " (column 5, lines 14–17).

Such "walls or constrictions" may be effective to some extent in physically preventing the majority of the dessicant material from leaving the confines of the "hollow space." But mere "constrictions" are surely not enough of a barrier to moisture contamination; and even the "walls" mentioned by the Pilz patent are not specifically said to be made of a material having a significant moisture barrier effect.

Moreover, the plastic spacer of the Pilz patent is extruded; and the patent fails to disclose how such "walls" may be provided at "longitudinally spaced" locations in view of the continuous longitudinal flow which is characteristic of extrusion processes. In the absence of such information, it appears that the Pilz structure is not manufacturable, at least not economically and in volume, and therefore is not a practical solution to the problem of moisture contamination which occurs between the time that the prefabricated spacer is cut to length and the time that it is installed in the window.

It should also be noted that Pilz's plastic is an unsuitable material for spacers, not only because it is permeable to moisture, but also because those adhesives which work with glass are not suitable for plastics.

BRIEF SUMMARY OF THE INVENTION

The present invention is an improvement over the type of prefabricated window spacer seen in the Burton and Pilz patents. It provides a spacer for use between window panes in multiple-glazed windows which comprises a selected length of elongated hollow container means defining an elongated dessicant compartment therewithin. The selected length is greater than required for installation in a given window.

A dessicant material is distributed through the compartment, and air-exchange means for are provided for permitting the dessicant to communicate with the air space between window panels for dehumidifying purposes after installation of the spacer.

There are a plurality of partition means, each formed of a body of moisture-barrier material maintained in sealing relationship with the interior walls of the compartment. The partition means are spaced at intervals along the length of the compartment so as to divide it into a plurality of sub-compartments substantially isolated from each other for the purposes of moisture diffusion and physical retention of the dessicant. Consequently, the spacer may be cut to the required shorter length prior to installation in the multiple-glazed window without losing or exposing to ambient moisture the dessicant contained in any of the sub-compartments except the particular sub-compartment which is at the location of the cut.

The use of a moisture-barrier material provides more effective moisture protection than the unspecified material used for the "walls" of the Pilz patent, if indeed the latter could even be manufactured economically in production volumes.

The container means may comprise sheet metal folded into a channel configuration so that the interior of the channel forms the compartment for containing the dessicant. The partition means may comprise respective elastic plugs received within the channel and compressed by the folded sheet metal to establish the desired sealing relationship.

Furthermore, the moisture barrier material may be selected from the class of elastic materials consisting of butyl rubber and latex rubber.

The features and advantages of the invention will be more fully appreciated from the following drawings and detailed description of a specific illustrative embodiment.

DETAILED DESCRIPTION OF THE PREFERRED EMBODIMENT

Figure 1:
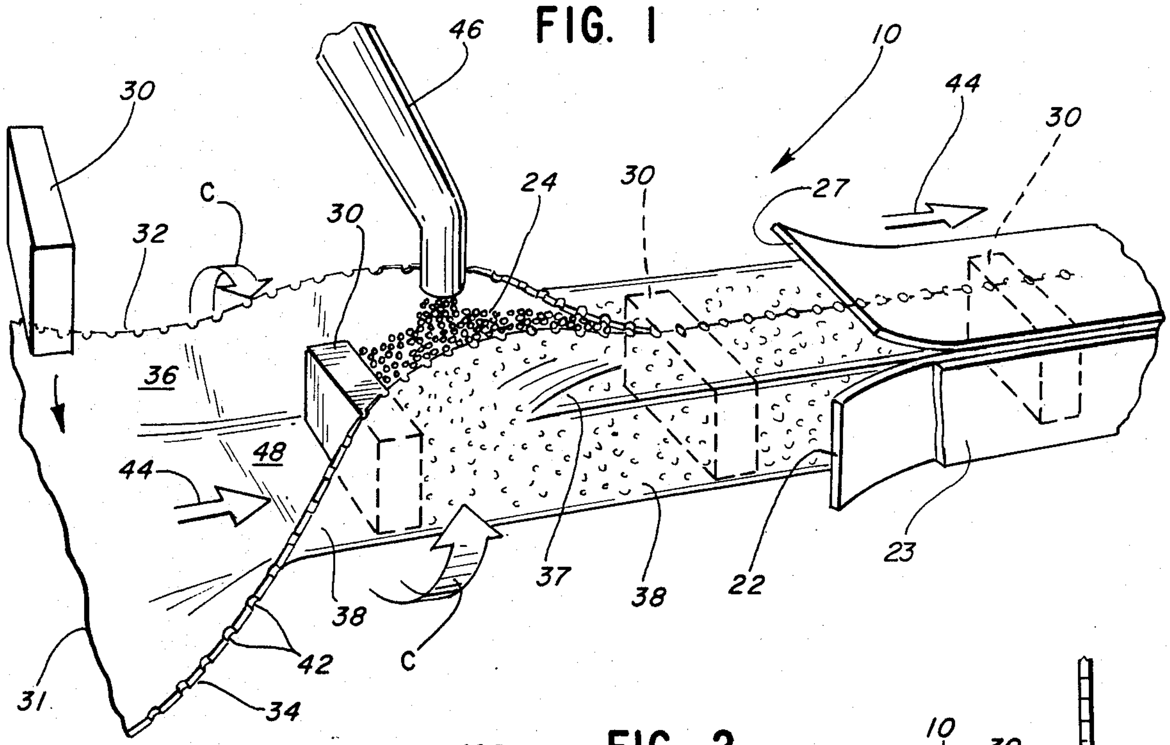
FIG. 1 is a perspective view of a retrofit multi-glazed window spacer in accordance with this invention, the rightmost portion thereof being illustrated in finished condition and those portions which are further to the left being illustrated in progressively earlier stages of manufacture, so as to represent the method of manufacturing this spacer in a schematic fashion.

The present invention provides a spacer 10 (see FIG. 4) which is adapted to be installed in a window 12. Typically the window is of the uninsulated or single-glazed type comprising a single pane of glass 14. In order to convert such a window to the insulated or double-glazed type, a second pane 16 is added on the indoor side of the first pane 14. The two panes then trap between them an air space 18 which serves the purpose of thermal insulation. It is necessary, however, to keep the air in the space 18 dehumidified so that moisture condensation does not occur and the building occupants are thus able to see clearly through the window.

Figure 4:
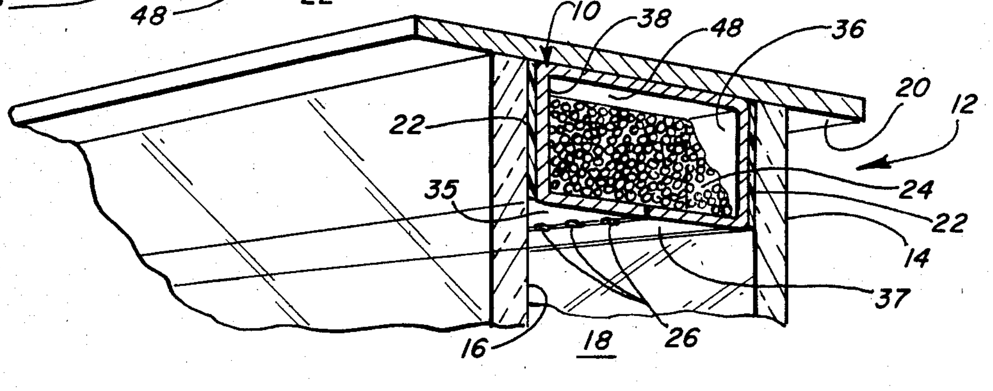
FIG. 4 is a fragmentary perspective view of the spacer of the preceding figures installed in a window.

The primary function of the spacer 10 is to physically maintain the panes 14 and 16 at the correct distance to define a the width of the insulating air space 18. Thus, one such spacer, as seen in FIG. 4, is mounted at the top surface 20 of the window casement. Others, not visible in the drawings, usually are similarly typically mounted at the bottom and at both sides of the casement. All of the spacers 10 are in contact with the panes 14 and 16, and it is a common practice to provide thin layers 22 of a sticky poly-iso-butylene adhesive material on those surfaces of the spacers which abut the glass panes. This adhesive serves to keep the spacers in contact with the glass panes and also acts as a barrier to the entry of moisture into the insulating air space 18 from the outside environment.

But during the process of installing the second pane of glass 16 in the window 12, some moisture is always trapped within the insulating air space 18, since the ambient air inevitably bears some moisture load at the time the retrofitting operation is carried out. The industry normally deals with this problem by making the spacer 10 hollow, and filling its interior with a dessicant material 24, such as powdered silica gel, which is capable of dehumidifying the insulating air space 18.

In order to permit this dessicant to come into contact with the air within the space 18, the surface of the spacer 10 which faces the air space 18 is provided with a row of holes 26 which are too small for the dessicant particles 24 to escape, but large enough for complete air interchange between the air space 18 and the interior of the spacer 10 to occur over an extended period of time.

Spacers of the type described are often prefabricated at factory locations, and later installed either at the factory or at the site of a building where a retrofit operation is being carried out. Such prefabricated spacers are likely to be precoated on opposite sides with the adhesive material 22, and that material in turn is covered with strips of release paper 23 which protect the adhesive material and are removed just prior to installation of the spacers.

Similarly, the surface of each spacer 10 where the air-exchange openings 26 are located is preferably covered with a strip of adhesive tape 27, preferably of a moisture-barrier material, in order to prevent the absorption of ambient moisture by the dessicant material 24 before the spacer is installed. Just prior to installation, the adhesive tape is removed to expose the holes so that thereafter air exchange can take place for the purpose of dehumidifying the air space 18.

The prefabricated spacers 10 are made in standard lengths which exceed the window dimensions expected to be encountered, and then are cut to fit the windows at the time of installation. In the past a plug was provided at each end of a standard length prefabricated spacer in order to prevent the dessicant 24 from falling out of the spacer. Such plugs also provided a measure of protection against the entrance of ambient moisture into the dessicant-containing interior of the spacer prior to installation.

But when cut to length, such prior art prefabricated spacers were thereby deprived of their end plugs at the cut-away ends, and that end then constituted an opening through which the entire dessicant content of the spacer was subject to physical loss as well as contamination by ambient moisture.

In accordance with this invention, therefore, a means is provided for dividing the dessicant-containing interior compartment 40 of the spacer 10 into a large number of separate sub-compartments 40A, 40B, 40C, 40D, etc., so that when one end of the spacer is cut off, only the particular sub-compartment 40D which is located at the place of the cut is opened thereby. That sub-compartment is subject to physical loss and ambient moisture contamination of its dessicant; but the other compartments are not. The desired compartmentalization is preferably achieved by installing within the interior of the spacer 10 a plurality of longitudinally spaced partitions 30.

Figure 3:
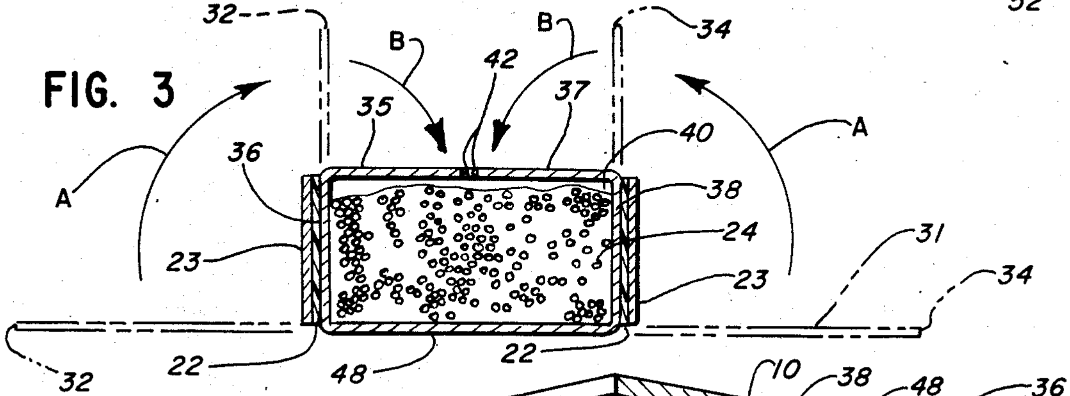
FIG. 3 is an end elevational view of the spacer of FIG. 2, looking from the cut end thereof. This figure also includes parts in phantom to further clarify the manufacturing process schematically illustrated in FIG. 1.

The spacer 10 comprises an outer shell which is preferably formed of an elongated strip 31 made of sheet metal, for example aluminum, which is folded to form a tubular channel of rectangular cross-section. The hollow interior of the channel defines the dessicant-containing compartment 40. As seen in FIG. 3, the outer shell of the spacer 10 is initially in the form of a flat sheet extending from one longitudinal margin 32 to the other such margin 34.

Subsequently marginal portions of the sheet 31 which define panels 35, 36 and 37, 38 are folded vertically upwardly as indicated by arrows A, and the portions which define panels 35 and 37 are then folded horizontally as indicated by arrows B (see also arrows C in FIG. 1), thereby forming the desired rectangular channel configuration which defines the interior compartment 40 for containing the dessicant material 24.

Rows of semicircular indentations 42 are formed on the opposite longitudinal margins 32 and 34 of the sheet 31 (see FIGS. 3 and 1), and when the folding operation is concluded the indentations located on these opposite margins match up to form the air-exchange holes 26 (see FIG. 4). The opposite margins may be spot-welded together, at locations between the air-exchange holes 26, to complete the assembly of the rectangular shell formed by the metal sheet 31.

The sequence of steps by which the spacer 10 is manufactured is schematically illustrated in FIG. 1. The flat metal sheet 31 moves from left to right, as indicated by arrows 44, while conventional metal-forming dies (not illustrated) fold the flaps 35, 36 and 37, 38 vertically up from the bottom panel 48, and then fold the flaps 35 and 37 horizontally inward, as illustrated by arrows C, to form the rectangular shell enclosing the dessicant compartment 40.

After the flaps 35, 36 and 37, 38 are folded up into a generally vertical attitude, but before they are folded into their final position and before the flaps 35 and 37 are folded horizontally inwardly, the partitions 30 are placed within the channel formed by the flaps 35, 36 and 37, 38; and a nozzle 46 then delivers a charge of powdered dessicant 24 into each of the sub-compartments 40A, 40B, 40C, 40D, etc. defined between each pair of adjacent partitions 30.

The partitions 30 are preferably rectangular blocks of a firm but elastically compressible rubbery material the chemical nature of which is such that it forms an effective moisture barrier. Butyl rubber is the preferred material, although latex rubber may also be acceptable in many applications. Such materials are capable of being compressed tightly by the folding of the sheet metal panels 35, 36, 37 and 38 to hold them firmly in place and to form a dessicant-retaining and moisture-tight seal between the partitions 30 and the folded metal sheet 31.

Thus after each partition 30 is inserted into the compartment 40, the adjacent portions of the panels 36 and 38 are folded to their final vertical positions and in the process are clamped tightly and compressively against the adjacent sides of the partitions. Then the panels 35 and 37 are folded horizontally inwardly and in the process these panels as well as the opposing or bottom panel are clamped tightly and compressively against the upper edges of the partitions 30.

This serves to hold the partitions tightly in place between the side panels 36 and 38, and also between the top panels 35, 37 and the bottom panel 48, in order to retain the partitions in place and to form a tight seal against the passage of moisture into, and the escape of dessicant material 24 from, the sub-compartments 40A, 40B, 40C, 40D etc. The moisture barrier material of the partitions 30 thus cooperates with the tight compressive fit at all four edges of each partition to prevent leakage of moisture from any one of the sub-compartments to any other.

The adhesive tape 27 is then applied over the upper surface of the top panels 35 and 37 to seal off the air-exchange holes 26. In addition, the adhesive layers 22 are applied over the side panels 36 and 38, and the release paper strips 23 placed thereover. The tape 27 and release paper strips 23 remain in place until the spacer 10 is installed.

Figure 2:
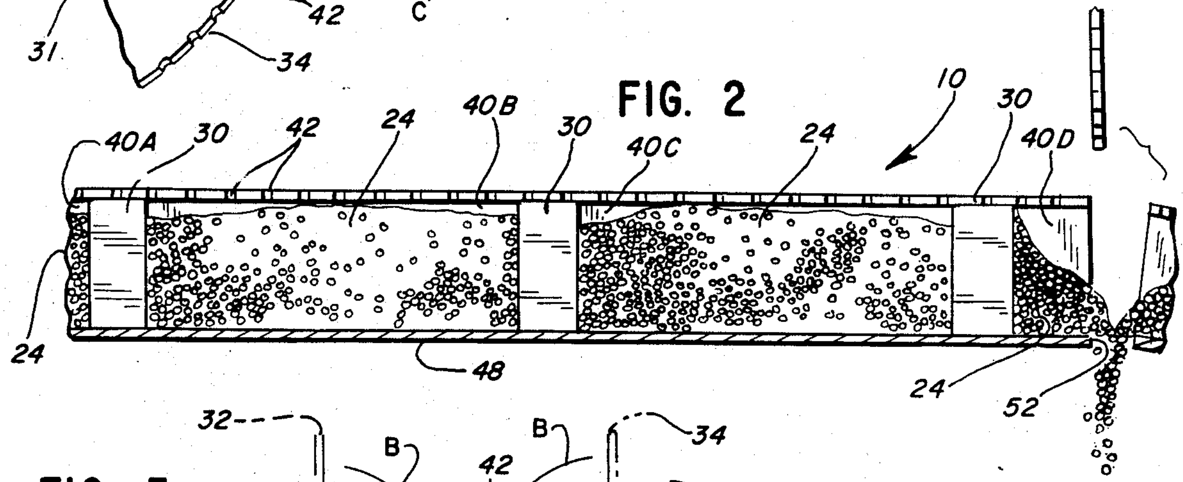
FIG. 2 is a longitudinal sectional view of the same spacer in finished condition, with one end thereof having been severed so as to cut the spacer to the appropriate length for installation in a window.

The spacers 10 are manufactured in standard lengths which exceed the largest window dimension expected to be encountered, and then are cut to the lengths required for each particular window at the time that they are installed. The spacing between each pair of adjacent partitions 30 is selected to be small in relation to the overall length of the spacer 10. As a result, when the spacer is cut to the required smaller length by a blade 50, as illustrated in FIG. 2, and the integrity of one sub-compartment 40D is disrupted thereby, only a small fraction of the total length of the spacer 10 is affected.

Thus only a small fraction of the total content of dessicant material 24 of the spacer 10 is lost through the cut end 52. Moreover, because of the tight compressive fit between all four edges of the elastic rubber partitions 30 and the metal shell 31, none of the dessicant material 24 is able to escape from the adjacent sub-compartment 40C.

In addition, even though the ruptured sub-compartment 40D is thus exposed to ambient humidity, none of that humidity can pass from sub-compartment 40D through the adjacent partition 30 into the adjacent subcompartment 40C or any of the other individually sealed sub-compartments 40A, 40B, etc. during the installation procedure.

Consequently, physical loss of dessicant material, as well as contamination thereof by ambient moisture during the retrofit procedure, is limited to a small fraction of the total, i.e. the relatively small amount of dessicant contained in the one sub-compartment 40D as compared to the much larger amount contained in all the other sub-compartments 40C, 40B, 40A etc. which make up the entire remaining length of the spacer 10. As a result, the great majority of the dessicant material originally contained in that portion of the spacer 10 which is actually installed in the window 12 is preserved against these hazards, with the result that the useful life of the multi-glazed window 12 after retrofit is greatly increased.

It will now be appreciated that the present invention provides an improved prefabricated spacer which has significant advantages in the retrofitting of multi-glazed windows.

For best results, the spacer of this invention should be used in conjunction with an improved type of corner piece which I have invented, and which is the subject of my co-pending U.S. patent application Ser. No. 06/721,795, now U.S. Pat. No. 4,651,482, entitled "Corner Construction for Prefabricated Spacer for Multiple-Glazed Windows," filed the same day as the present application.

The invention claimed is:

1. A method of starting with an elongated sheet having longitudinal edges and longitudinal edge portions adjacent said longitudinal edges, and forming said sheet into an elongated hollow window-pane spacer defining an elongated substantially closed desiccant-containing compartment therewithin having interior walls and a selected length, and providing said compartment with a plurality of partitions in sealing relationship with said interior walls and spaced at intervals so as to divide said length into a plurality of subcompartments substantially isolated from each other whereby to achieve moisture diffusion and physical retention of the desiccant; said method comprising the steps of:

folding said longitudinal edge portions of said sheet to form flaps at an angle to said sheet, whereby said flaps form side walls of an open channel adapted to receive said desiccant and said partitions;

loading said desiccant and said partitions into said open channel;

and folding said longitudinal edge portion of at least one of said flaps at an angle to said one flap to divide said one flap into a side panel and a top panel with said top panel then abutting said other flap to close said channel and thereby form said substantially closed desiccant-containing compartment.

2. A method as in claim 1, wherein said longitudinal edge portions of both said flaps are folded at angles to their respective flaps to divide both said flaps into respective side panels and top panels with said top panels then abutting each other to close said channel and thereby form said substantially closed desiccant-containing compartment.

3. A method as in claim 2, wherein said top panels abut along said longitudinal edges of said sheet.

4. A method as in claim 1, wherein said longitudinal edge of said one flap is formed with spaced indentations adapted to form vent holes for air exchange with said substantially closed desiccant-containing compartment.

5. A method as in claim 4, further comprising the step of mounting removable closure means over said vent holes.

6. A method as in claim 1, further comprising the step of applying an adherent sealant material to the exterior of said side panel.

7. A method as in claim 6, further comprising the step of mounting a releasable cover over said sealant material.

8. A spacer made by the method of claim 1.

9. A spacer as in claim 8, wherein said partitions are formed of moisture barrier material.

10. A spacer as in claim 9 wherein said moisture barrier material is selected from the class of elastic materials consisting of butyl rubber and latex rubber.

* * * * *